D. STRAUCH.
CONVERTIBLE WHEELED VEHICLE.
APPLICATION FILED NOV. 8, 1920.
1,382,566.
Patented June 21, 1921.
4 SHEETS—SHEET 1.
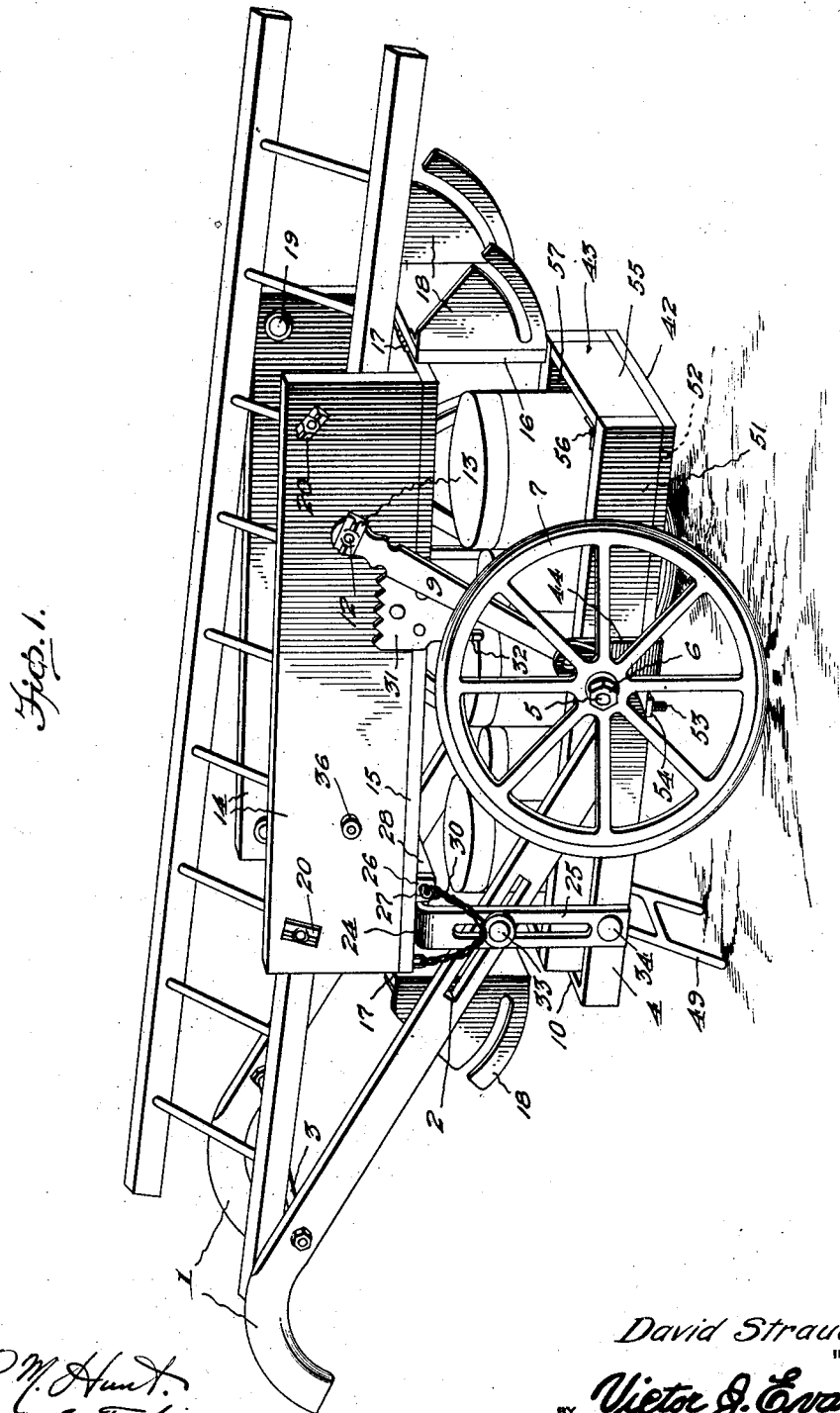

D. STRAUCH.
CONVERTIBLE WHEELED VEHICLE.
APPLICATION FILED NOV. 8, 1920.
1,382,566.
Patented June 21, 1921.
4 SHEETS—SHEET 2.
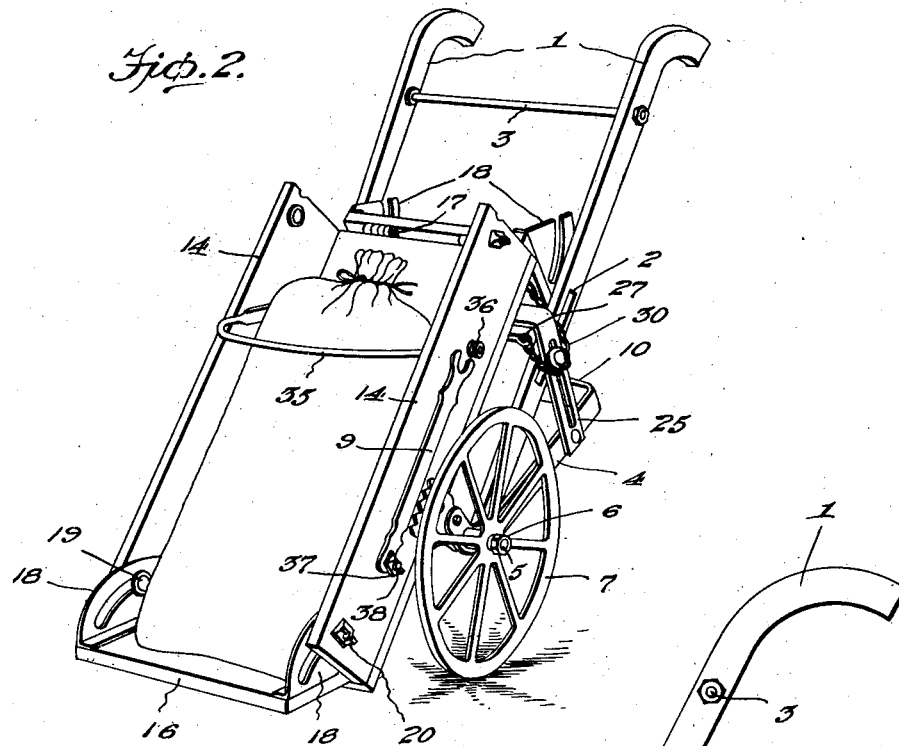
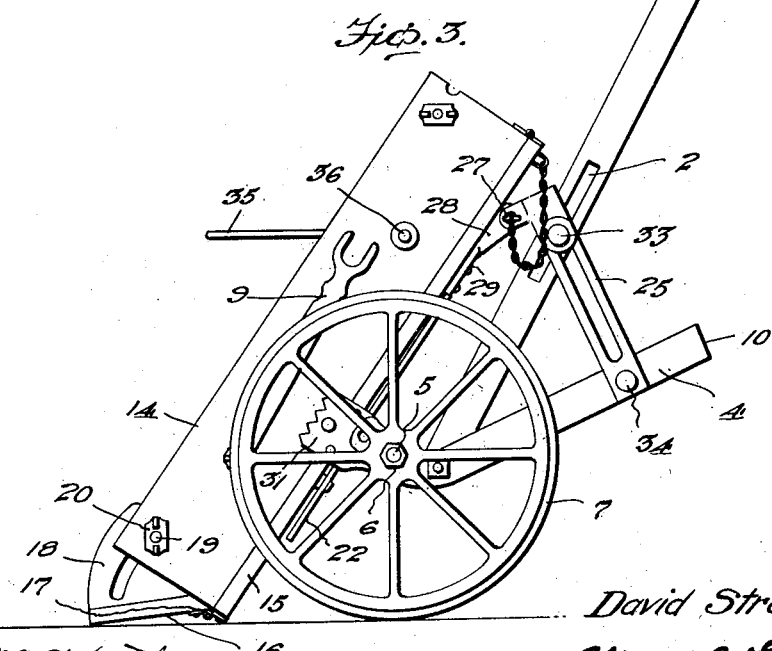
David Strauch
INVENTOR
BY Victor J. Evans
ATTORNEY
WITNESS:

D. STRAUCH.
CONVERTIBLE WHEELED VEHICLE.
APPLICATION FILED NOV. 8, 1920.
1,382,566.
Patented June 21, 1921.
4 SHEETS—SHEET 3.
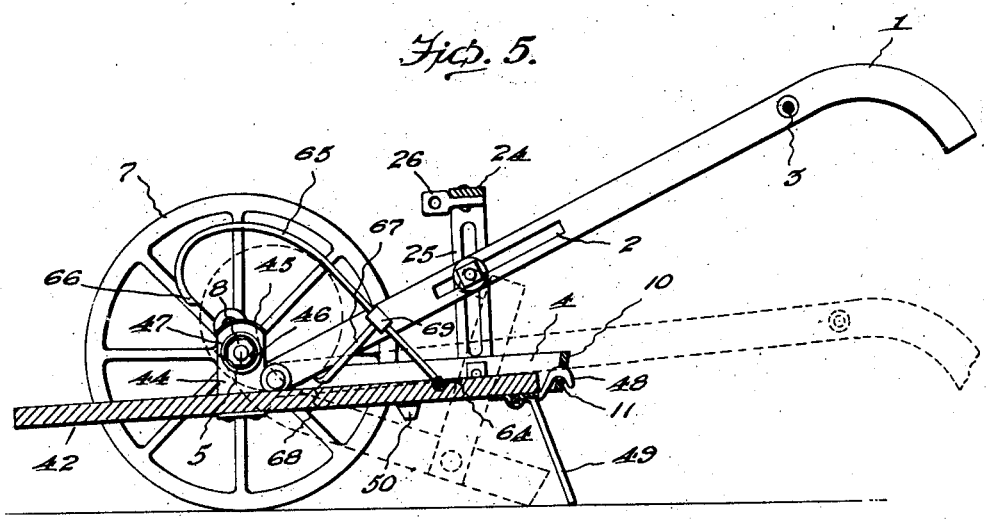
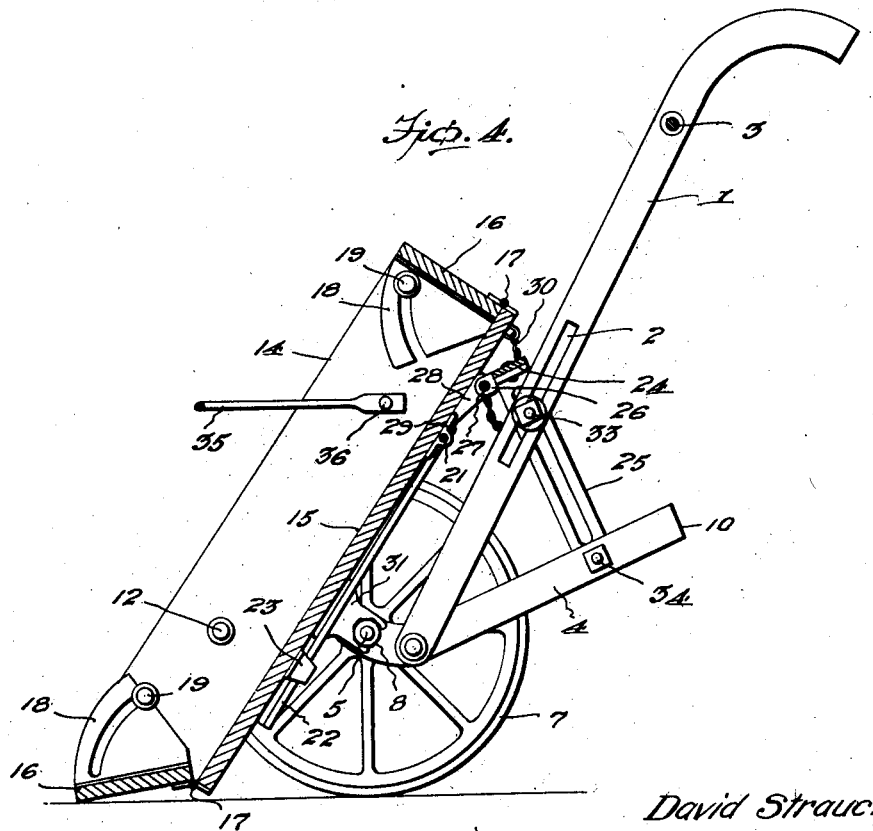
David Strauch
INVENTOR

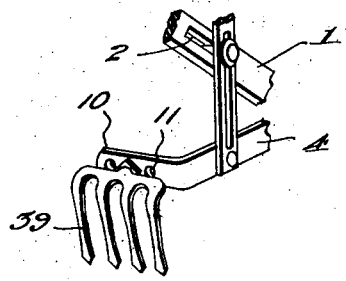
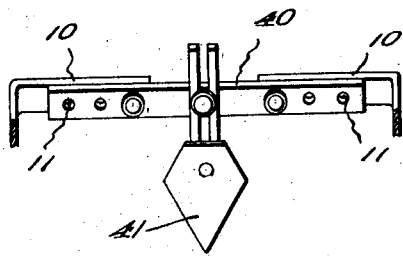
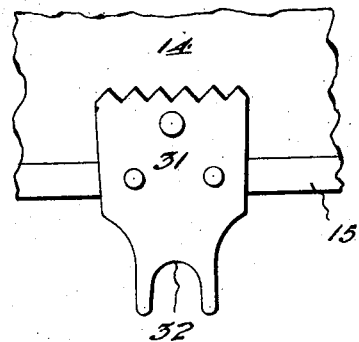
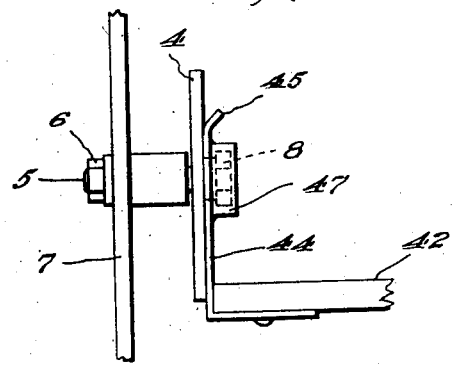
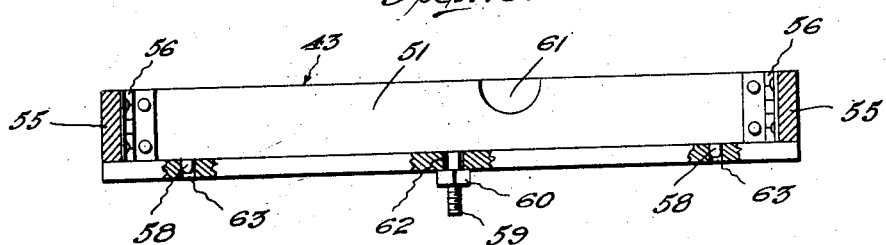

UNITED STATES PATENT OFFICE.

DAVID STRAUCH, OF CRESTLINE, OHIO.

CONVERTIBLE WHEELED VEHICLE.

1,382,566.  Specification of Letters Patent.  Patented June 21, 1921.

Application filed November 8, 1920. Serial No. 422,603.

*To all whom it may concern:*

Be it known that I, DAVID STRAUCH, a citizen of the United States, residing at Crestline, in the county of Crawford and State of Ohio, have invented new and useful Improvements in Convertible Wheeled Vehicles, of which the following is a specification.

The object of my present invention is the provision of a convertible wheeled vehicle having a wide range of usefulness and possessed of many practical points of advantage.

To the attainment of the foregoing the invention consists in the improvement as hereinafter described and definitely claimed.

In the accompanying drawings, hereby made a part hereof:—

Figure 1 is a perspective showing my novel convertible vehicle as arranged and equipped for use as a paper hanger's cart.

Fig. 2 is a perspective showing my improvement as adapted for use as a cart for carrying barrels and bags.

Fig. 3 is a side elevation of the same.

Fig. 4 is a longitudinal section of the same.

Fig. 5 is a longitudinal section showing my improvement as adapted for use as a low pick up cart in transporting heavy barrels or the like; said view shown by dotted line the manner in which the wheeled frame is adapted to be separated from the platform on which the barrel or other article to be carried is superimposed.

Fig. 6 is a detail perspective showing a ground working implement adapted to be employed in the improvement.

Fig. 7 shows another ground working implement.

Fig. 8 is an enlarged detail showing the arrangement of one of the plates 31.

Fig. 9 is a fragmentary view showing the manner in which the platform 42 is secured to and suspended from one of the axles.

Fig. 10 is a sectional view illustrative of the collapsible frame and its appurtenances.

Similar numerals of reference designate corresponding parts in all of the views of the drawings.

Among other elements my novel vehicle comprises two handle bars 1, preferably of wood, longitudinally slotted at 2 and having their rear portions fixedly connected together through the medium of a cross bar 3. At their forward ends the said handle bars 1 are connected to apertured metallic straps 4 that are mounted on axles 5 and extending above and below said axle. Secured by nuts 6 on the axles 5 are ground wheels 7, and detachably secured by inner nuts 8 on the axle 5 are comparatively long metallic bars 9. The said metallic straps 4 are extended longitudinally from the axle 5 and provided at their rear ends with inwardly reaching arms 10 in each of which are apertures 11. The metallic bars 9 are connected by bolts 12 and wing nuts 13 to the outer sides of the side walls 14 of a preferably wooden body. The said wooden body also comprises a bottom wall 15 fixed to the side walls, and end walls 16, hinged at 17 to the ends of the bottom wall 15. On the said end walls 16 are slotted flanges 18 which are adapted when the end walls are swung to closed position to receive in their slotted portions the shanks or headed bolts 19 on which are wing nuts 20. Manifestly when the end walls 16 are released they may be swung into open position so that a ladder or other long article may be conveniently carried in the body. Pivoted at 21 to the underside of the body is a prop 22 for use in supporting the body in horizontal position. When not in use the said prop 22 is detachably held by a keeper 23 flat against the underside of the body.

Arranged transversely under the rear portion of the bottom of the body is a metallic cross bar 24 having pendent slotted arms 25 and also having forwardly extending apertured ears 26. The said cross bar 24 is not connected directly to the body. On the other hand its apertured ears 26 are detachably connected by cotter pins 27 to apertured plates 28 permanently secured at 29 to the bottom of the body. The said cotter pins 27 are joined by chains 30 to the body so as to preclude possibility of the said cotter pins 27 being misplaced or lost. On the side walls of the body and depending below the bottom of the body are metallic plates 31 in the lower ends of which are bifurcations 32. The slotted arms 25 on the cross bar 24 are connected by bolts 33 to the handle bars 1 and by bolts 34 to the metallic straps 4. I would have it understood at this point that the metallic bars 9 and the cross bar 24 are capable of being readily disassociated from the body; and I would also have it understood that the body is provided with a metallic loop 35 pivotally connected at 36 to the inner sides of the side walls of the body so that it may be swung into and out of the body. When in its extended position, the said metallic loop 35 may be utilized to hold a barrel or the like in the body as appears in Fig. 2. I would also have it understood at this point that the metallic bars 9 are capable of being disconnected from the axles 5 and swung to longitudinal idle positions alongside of the side walls of the body in which positions they may be detachably secured by nuts 37 or bolts 38. With the bars 9 disconnected from the axle, and the cross bar 24 disconnected from the body, the wheeled frame with handle bars 1 may be used to advantage for the movement of ground working implements of which the implement 39 is an example; the said implements 39 being connected as shown to the apertured arms 10 on the straps 4, or if preferred an auxiliary bar 40 may be connected to the arms 10 to bridge or space therebetween, and a longitudinal central ground working implement 41 may be connected to and carried by said bar 40.

For use in association with the body described I provide a platform 42 and a foldable or collapsible frame 43. The platform 42 is also capable of use independently of the body as will hereinafter be made clear. The said platform 42 is preferably of wood and is provided with apertured metallic ears 44 the ends 45 of which are beveled and in which are apertures 46, surrounded at the inner sides of the ears by bosses 47. At one end the platform 42 is provided with hooks 48 while at one side the platform is provided with a swinging prop 49 and a keeper 50 to detachably hold the said prop when the same is idle. The collapsible frame 43 includes a main side bar 51 on which are dowel pins 52 and a threaded bolt 53, equipped with a nut 54. Said frame also comprises bars 55, hinged at 56 to the main side bar 51, and a supplemental side bar 57 designed to be opposed to the ends of the end bars 55, and having depending dowel pins 58 and a depending threaded bolt 59 on which is a nut 60. At 61 in the outer sides of the side bars 51 and 57 are countersinks 61 to receive the bosses 47 on the ears 44 of the platform 42 when the braces are relatively arranged as shown in Fig. 1. From this it follows that the collapsible frame 43 and the platform 42 will in the arrangement shown in Fig. 1 be supported by the nuts 8 on the inner ends of the axles 5; it being understood in this connection that the said nuts are disposed in the apertures 46 of the ears 44 and that the bolts 53 and 59 of the collapsible frame 43 are extended through apertures 62 in the platform 42, the nuts on said bolts 53 and 59 being arranged below the platform 42 and the dowel pins on the collapsible frame being arranged in the complementary sockets 63 in the platform 42.

At the opposite side of the platform 42, with reference to the prop 49 and its keeper 50, the platform is provided with a coupling member 64 for the detachable connection of the looped major member 65 of a barrel holding device best shown in Fig. 5. The said looped major member 65 has the bight of its loop removably arranged in the coupling member 64 and also has the terminal portions of its side arm shaped into hooks 66. In addition to the said major member 64 the barrel holding device includes an auxiliary member 67 having hooks 68; the said auxiliary member 67 being carried by a plate 69 that is slidable on the major member 65. By virtue of the said slidable capacity of the auxiliary member 67 the barrel holding device may be readily accommodated to barrels of different diameters. It will be manifest from the foregoing that when the platform 42 is disassociated from the wheeled frame and laid flat on the ground as illustrated a heavy barrel may be conveniently rolled on the platform 42 and may be secured in position thereon by the barrel holding device. The wheeled frame may then be moved toward the platform 42 and appropriately manipulated to engage the apertured arms 10 with the hooks 48 on the platform 42, after which the wheeled frame and the platform may be manipulated to raise the apertured ears 44 on the platform into engagement with the nuts on the inner ends of the axles 5 when a low pick up cart will be produced for the convenient transportation of the barrel; said cart being shown in Fig. 5.

It will be apparent from the foregoing that my novel convertible vehicle is capable of being made into a paper hanger's cart of large capacity, or into a cart for the convenient transportation of barrels, bags and the like, or into a low pick up cart for picking up and transporting heavy barrels or into a wheeled cultivator, also, that the convertible vehicle is simple and inexpensive in construction and in the various capacities in which it is adapted to be used it is well adapted to withstand the usage to which devices of corresponding character are ordinarily subjected. It will further be appreciated that in the conversion of my novel cart from one device into another no tools are necessary except an ordinary wrench, and it is not necessary in any event to invoke the assistance of skilled labor.

In the use of my improvement the ground wheels may when necessary be reversed so as to run inside the frame and travel between the rows instead of straddling one row.

The construction herein illustrated and described is the best construction of which I am cognizant, but I do not desire to be understood as confining myself to the specific construction and relative arrangement of parts inasmuch as in the future practice of the invention such changes in the form and relative arrangement or elements may be made as fairly fall within the scope of my invention as claimed.

Having described my invention, what I claim and desire to secure by Letters-Patent, is:—

1. A convertible wheeled vehicle including a frame with ground wheels and handles, a removable body detachably connected with said frame, a removable platform detachably connected at one end to the frame, and a removable collapsible frame connected with the platform and with the first-named frame.

2. A convertible wheeled vehicle including a frame with ground wheels and handles, a removable body detachably connected with said frame, a removable platform detachably connected at one end to the frame, and a removable collapsible frame connected with the platform and with the first-named frame; the detachable connection of the body with the first-named frame comprising supporting bars for the forward portion of the body, detachably connected with the frame.

3. A convertible wheeled vehicle including a frame with ground wheels and handles, a removable body detachably connected with said frame, a removable platform detachably connected at one end to the frame, and a removable collapsible frame connected with the platform and with the first-named frame; the first-named frame being provided with axles to carry the ground wheels, and the body being provided with pendent bifurcated plates adapted in a lower position of the body to straddle the inner portions of the axles.

4. A convertible wheeled vehicle including a frame with ground wheels and handles, a body on the frame, axles carried by the frame and bearing the ground wheels, detachable supporting bars connected to the body and detachably engaged with the axles, and pendent bifurcated plates carried by the body and adapted in a lower position of the body to straddle said inner portions of the axles.

5. In a wheeled vehicle, the combination of axles, ground wheels thereon, frame straps connected to and extending rearwardly from the axles and having inwardly reaching apertured arms at their rear ends, handles connected to the said frame straps at points adjacent to the axle and extending upwardly and rearwardly from said points, and a cross bar having pendent end portions connected to the handles and the said frame straps.

6. In a wheeled vehicle, the combination of axles, ground wheels thereon, frame straps connected to and extending rearwardly from the axles and having inwardly reaching apertured arms at their rear ends, handles connected to the said frame straps at points adjacent to the axle and extending upwardly and rearwardly from said points, and a cross bar having pendent end portions connected to the handles and the said frame straps, with a platform having hooks at its rear end to engage said apertured arms of the frame straps and also having upwardly extending apertured ears adapted to be sprung into engagement with the inner portions of the axles.

7. In a wheeled vehicle, the combination of axles ground wheels thereon, frame straps connected to and extending rearwardly from the axles and having inwardly reaching apertured arms at their rear ends, handles connected to the said frame straps at points adjacent to the axle and extending upwardly and rearwardly from said points, and a cross bar having pendent end portions connected to the handles and the said frame straps, with a platform having hooks at its rear end to engage said apertured arms of the frame straps and also having upwardly extending apertured ears adapted to be sprung into engagement with the inner portions of the axles; the said platform having detachably connected to its upper side a barrel holder.

8. In a wheeled vehicle, the combination of axles, ground wheels thereon, frame straps connected to and extending rearwardly from the axles and having inwardly reaching apertured arms at their rear ends, handles connected to the said frame straps at points adjacent to the axle and extending upwardly and rearwardly from said points, and a cross bar having pendent end portions connected to the handles and the said frame straps, with a body connected with the said cross bar and having pendent bifurcated plates to straddle the inner portions of the axles and also having a swinging loop to hold a barrel or the like in the body.

9. In a wheeled vehicle, the combination of axles, ground wheels thereon, frame straps connected to and extending rearwardly from the axles and having inwardly reaching apertured arms at their rear ends, handles connected to the said frame straps at points adjacent to the axle and extending upwardly and rearwardly from said points, and a cross bar having pendent end portions connected to the handles and the said frame straps, with a body connected with the frame and having swinging end gates, and means to detachably secure said end gates in closed position.

10. In a convertible vehicle, the combination of a frame including straps having inwardly reaching rear arms, axles carried by the frame, ground wheels on the axle, handles connected with the frame at points adjacent to the axle, a platform detachably connected at its rear end with the inwardly reaching arms of the said straps, a body connected with the frame and equipped with means to support its forward portion from the axles, and a collapsible supplemental frame arranged on and detachably connected to the platform and having recesses in the outer sides of its side bars to receive the inner portions of the axles, whereby the collapsible frame is supported directly by the axles.

11. In a convertible vehicle, the combination of a frame including straps having inwardly reaching rear arms, axles carried by the frame, ground wheels on the axle, handles connected with the frame at points adjacent to the axle, a platform detachably connected at its rear end with the inwardly reaching arms of the said straps, a body connected with the frame and equipped with means to support its forward portion from the axles, and a collapsible supplemental frame arranged on and detachably connected to the platform and having recesses in the outer sides of its side bars to receive the inner portions of the axles, whereby the collapsible frame is supported directly by the axles; the said body and the said platform each having a swinging prop at its underside, and a keeper to detachably retain said prop in idle position.

In testimony whereof I affix my signature.

DAVID STRAUCH.